(12) United States Patent
Iizuka

(10) Patent No.: US 10,614,276 B2
(45) Date of Patent: Apr. 7, 2020

(54) PROFILE INFORMATION EXCHANGE SYSTEM

(71) Applicant: MIMIWORKS CO., LTD., Tokyo (JP)

(72) Inventor: Takashi Iizuka, Tokyo (JP)

(73) Assignee: MIMIWORKS CO., LTD., Tokyo (JP)

(*) Notice: Subject to any disclaimer, the term of this patent is extended or adjusted under 35 U.S.C. 154(b) by 0 days.

(21) Appl. No.: 16/343,968

(22) PCT Filed: Oct. 24, 2017

(86) PCT No.: PCT/JP2017/038260
§ 371 (c)(1),
(2) Date: Apr. 22, 2019

(87) PCT Pub. No.: WO2018/079512
PCT Pub. Date: May 3, 2018

(65) Prior Publication Data
US 2019/0332837 A1   Oct. 31, 2019

(30) Foreign Application Priority Data

Oct. 24, 2016 (JP) .................................. 2016-208067

(51) Int. Cl.
*G06K 7/14* (2006.01)
*G06F 7/58* (2006.01)
(Continued)

(52) U.S. Cl.
CPC .............. *G06K 7/1417* (2013.01); *G06F 7/58* (2013.01); *H04L 67/303* (2013.01);
(Continued)

(58) Field of Classification Search
CPC ....... G06K 7/1417; G06F 7/58; H04L 67/303; H04W 4/80; G06Q 20/3274; G06Q 50/01
See application file for complete search history.

(56) References Cited

U.S. PATENT DOCUMENTS 8,010,610 B2 * 8/2011 Bumiller .............. G06Q 10/047
345/168
8,676,123 B1 * 3/2014 Hinkle ............ H04M 1/274508
455/41.2
(Continued)

FOREIGN PATENT DOCUMENTS

JP  2006018593 A  1/2006
JP  2006261938 A  9/2006
(Continued)

OTHER PUBLICATIONS

International Search Report with English Translation from PCT/JP2017/038260 dated Jan. 9, 2018 (5 pages).

*Primary Examiner* — Daniel I Walsh
(74) *Attorney, Agent, or Firm* — Calfee, Halter & Griswold LLP

(57) ABSTRACT

A processor in a first portable terminal of a first user advertises an advertising signal including a unique service identification code and a randomly generated identification code and displays a two-dimensional code corresponding to a randomly generated identification code based on profile information of the first user on a screen of the first portable terminal. A processor in a second portable terminal of a second user specifies the first portable terminal of an exchange partner by reading the two-dimensional code displayed on the screen of the first portable terminal and determining coincidence with the received randomly generated identification code, and exchanges the profile information.

14 Claims, 3 Drawing Sheets

(51) Int. Cl.
*H04L 29/08* (2006.01)
*H04W 4/80* (2018.01)
*G06Q 50/00* (2012.01)
*G06Q 20/32* (2012.01)

(52) U.S. Cl.
CPC ......... *G06Q 20/3274* (2013.01); *G06Q 50/01* (2013.01); *H04W 4/80* (2018.02)

(56) References Cited

U.S. PATENT DOCUMENTS

| | | | |
|---|---|---|---|
| 10,210,525 B2 * | 2/2019 | Vadura | G06Q 30/01 |
| 10,237,713 B1 * | 3/2019 | Lifschultz | H04L 67/306 |
| 10,390,191 B2 * | 8/2019 | Nordstrom | H04L 69/329 |
| 10,462,637 B1 * | 10/2019 | Lifschultz | G06Q 10/00 |
| 2003/0036914 A1 * | 2/2003 | Fitzpatrick | G06Q 30/02 |
| | | | 705/319 |
| 2005/0233697 A1 * | 10/2005 | Yu | H04M 1/274516 |
| | | | 455/41.3 |
| 2007/0129959 A1 * | 6/2007 | Bransky | G06Q 10/10 |
| | | | 455/73 |
| 2007/0286113 A1 * | 12/2007 | Kirke | H04L 63/101 |
| | | | 370/328 |
| 2008/0188207 A1 * | 8/2008 | Lee | H04W 8/18 |
| | | | 455/414.1 |
| 2009/0054103 A1 * | 2/2009 | Stavenow | H04L 65/1096 |
| | | | 455/556.2 |
| 2009/0150251 A1 * | 6/2009 | Zhitomirsky | G06Q 30/06 |
| | | | 705/26.1 |
| 2009/0294539 A1 * | 12/2009 | Kim | G06F 16/9554 |
| | | | 235/462.01 |
| 2010/0009702 A1 * | 1/2010 | James | H04W 4/12 |
| | | | 455/466 |
| 2010/0261502 A1 * | 10/2010 | Martin-Cocher | G06F 16/24564 |
| | | | 455/556.1 |
| 2011/0101086 A1 * | 5/2011 | Yach | G06Q 10/10 |
| | | | 235/375 |
| 2011/0113084 A1 * | 5/2011 | Ramnani | G06Q 30/02 |
| | | | 709/201 |
| 2013/0186954 A1 * | 7/2013 | Denny | G06F 17/00 |
| | | | 235/375 |
| 2013/0217365 A1 * | 8/2013 | Ramnani | H04L 67/306 |
| | | | 455/414.1 |
| 2014/0066044 A1 * | 3/2014 | Ramnani | H04W 8/24 |
| | | | 455/418 |
| 2014/0108935 A1 * | 4/2014 | Yuen | G06F 3/048 |
| | | | 715/728 |
| 2015/0006672 A1 * | 1/2015 | Morel | G06Q 30/0269 |
| | | | 709/217 |
| 2016/0170695 A1 * | 6/2016 | Sakashita | G06F 3/1236 |
| | | | 358/1.15 |
| 2016/0321644 A1 * | 11/2016 | Zeng | G06Q 20/3274 |
| 2016/0330027 A1 * | 11/2016 | Ebrahimi | H04L 9/3066 |
| 2017/0068785 A1 * | 3/2017 | Experton | G06F 21/6245 |
| 2018/0130053 A1 * | 5/2018 | Matthews | G06Q 20/3224 |
| 2019/0121913 A1 * | 4/2019 | Singh | G06K 19/06037 |
| 2019/0164161 A1 * | 5/2019 | Sultan | G06Q 20/3276 |
| 2019/0332837 A1 * | 10/2019 | Iizuka | H04M 1/00 |

FOREIGN PATENT DOCUMENTS

| | | |
|---|---|---|
| JP | 2014010833 A | 1/2014 |
| JP | 2014017561 A | 1/2014 |
| JP | 2014120944 A | 6/2014 |
| JP | 2016105080 A | 6/2016 |

* cited by examiner

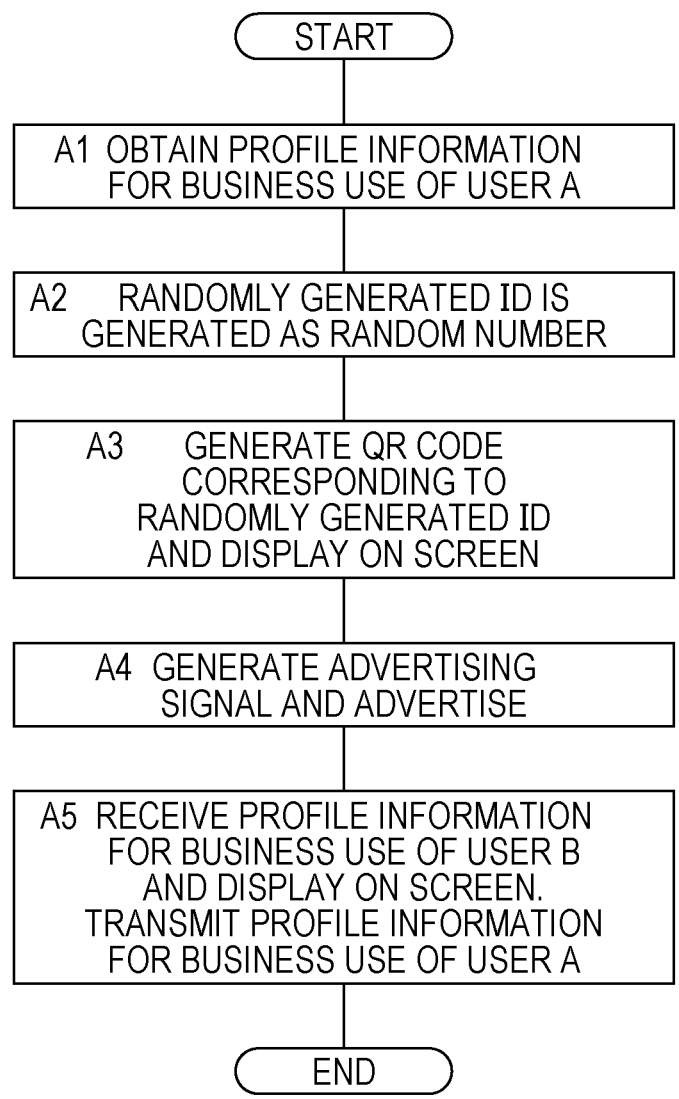

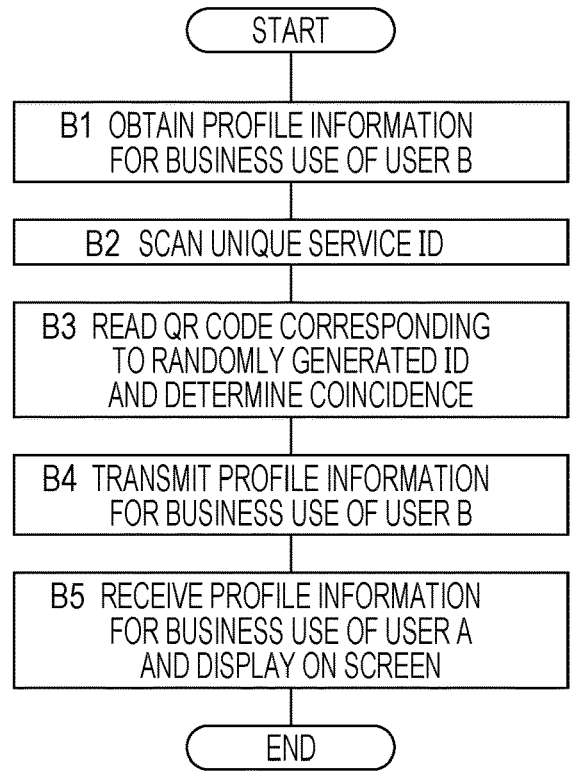
FIG. 3B  SECOND PORTABLE TERMINAL 10B (USER B)
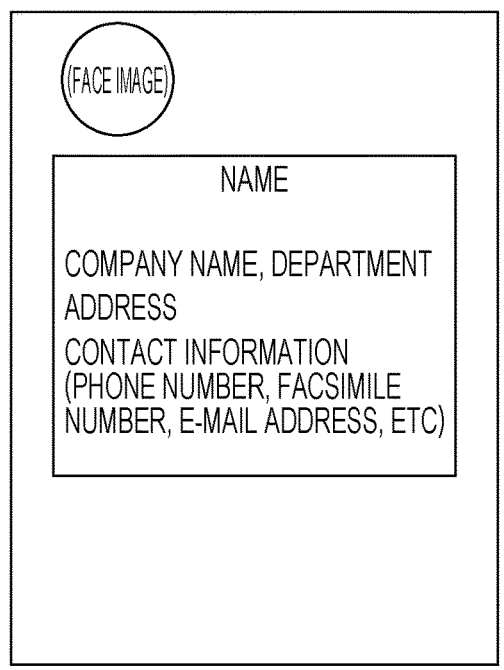
FIG. 4  DISPLAY EXAMPLE OF PROFILE INFORMATION FOR BUSINESS USE OF EXCHANGE PARTNER IN PORTABLE TERMINAL 10

US 10,614,276 B2

PROFILE INFORMATION EXCHANGE SYSTEM

CROSS-REFERENCE TO RELATED APPLICATIONS

This application is a 371 of PCT Application No. PCT/JP2017/038260 filed on Oct. 24, 2017, which claim priority to Japanese Application No. 2016-208067 filed on Oct. 24, 2016, the contents of which are hereby incorporated by reference as if recited in their entirety.

TECHNICAL FIELD

The present invention relates to a profile information exchange system, and further relates to a profile information exchange method.

BACKGROUND ART

Technologies of enabling exchange of profile information (personal information) of terminal users by short-distance wireless communication (direct wireless communication) between portable terminals without intervention of an external communication facility environment such as Internet connection and an intermediary server are suggested (refer to, for example, Patent Literatures 1 and 2).

In addition, a technology of registering a portable terminal of a user in a television using an authentication key in a form of an image such as a QR code (registered trademark) is suggested (refer to, for example, Patent Literature 3).

RELATED ART LITERATURE

Patent Literature

Patent Literature 1: JP 2014-17561 A
Patent Literature 2: JP 2014-120944 A
Patent Literature 3: JP 2014-10833 A

DISCLOSURE OF THE INVENTION

Problems to be Solved by the Invention

However, there is no suggested technology of easily and surely specifying an exchange partner of the profile information when exchanging the profile information of the terminal users by the direct wireless communication between the portable terminals.

An object of the disclosures made herein is to provide a technology of easily and surely specifying the exchange partner of the profile information.

Means for Solving the Problems

In order to solve the above-described object, a profile information exchange system in one aspect of the disclosures is a profile information exchange system which enables exchange of profile information of terminal users by direct wireless communication between portable terminals without intervention of an external communication facility environment, the system provided with a first portable terminal that provides a profile information exchange service and a second portable terminal that uses the profile information exchange service. A processor in the first portable terminal of a first user advertises a signal including both a unique service identification code and a randomly generated identification code based on profile information of the first user and displays a two-dimensional code corresponding to the randomly generated identification code based on the profile information of the first user on a screen of the first portable terminal. A processor in the second portable terminal of a second user reads the two-dimensional code displayed on the screen of the first portable terminal and determines coincidence with the received randomly generated identification code, thereby specifying the first portable terminal of an exchange partner, and exchanges profile information of the second user with the profile information of the first user.

A profile information exchange method in another aspect of the disclosures allows a processor in a first portable terminal of a first user that provides a profile information exchange service to advertise a signal including both a unique service identification code and a randomly generated identification code based on profile information of the first user and to display a two-dimensional code corresponding to the randomly generated identification code based on the profile information of the first user on a screen of the first portable terminal in a profile information exchange system that enables exchange of profile information of terminal users by direct wireless communication between portable terminals without intervention of an external communication facility environment. This also allows a processor in a second portable terminal of a second user that uses the profile information exchange service to read the two-dimensional code displayed on the screen of the first portable terminal and determine coincidence with the received randomly generated identification code, thereby specifying the first portable terminal of an exchange partner, and to exchange profile information of the second user with the profile information of the first user in the profile information exchange system.

In each of the above-described aspect, the unique service identification code partially includes predetermined characters for specifying the profile information exchange service. The randomly generated identification code is generated as a random number so as to correspond to only a character string of the profile information.

The profile information of the first user and the profile information of the second user are created in advance for business use and private use and are registered in advance in an address book of the first portable terminal and an address book of the second portable terminal, respectively.

When image data is included in the profile information, the image data is compressed and transmitted. Furthermore, the direct wireless communication is short-distance wireless communication including BLE communication. When the direct wireless communication is the BLE communication, the first portable terminal acts as a peripheral and provides the profile information exchange service, the second portable terminal acts as a central and uses the profile information exchange service, the signal is an advertising signal including the unique service identification code and the randomly generated identification code, and the unique service identification code and the randomly generated identification code are universally unique identification codes (UUIDs).

Effects of the Invention

According to the disclosed technology, since the first portable terminal from which the two-dimensional code is read and the second portable terminal which reads the two-dimensional code mutually become the exchange targets, it is possible to easily and surely specify the exchange partner of the profile information when exchanging the profile information.

Also, according to the disclosed technology, the profile information may be exchanged without requiring pairing setting in advance between the first portable terminal and the second portable terminal.

Other objects, features, and advantages will become apparent upon reading of the following detailed description taken in conjunction with drawings and appended claims.

BRIEF DESCRIPTION OF THE DRAWINGS

FIG. 3A is a flowchart for illustrating profile information exchange processing in a first portable terminal of one embodiment;

FIG. 3B is a flowchart for illustrating profile information exchange processing in a second portable terminal of one embodiment; and FIG. 4 is a view for illustrating a display example of profile information for business use of an exchange partner in the portable terminal of one embodiment.

MODE FOR CARRYING OUT THE INVENTION

Figure 1:
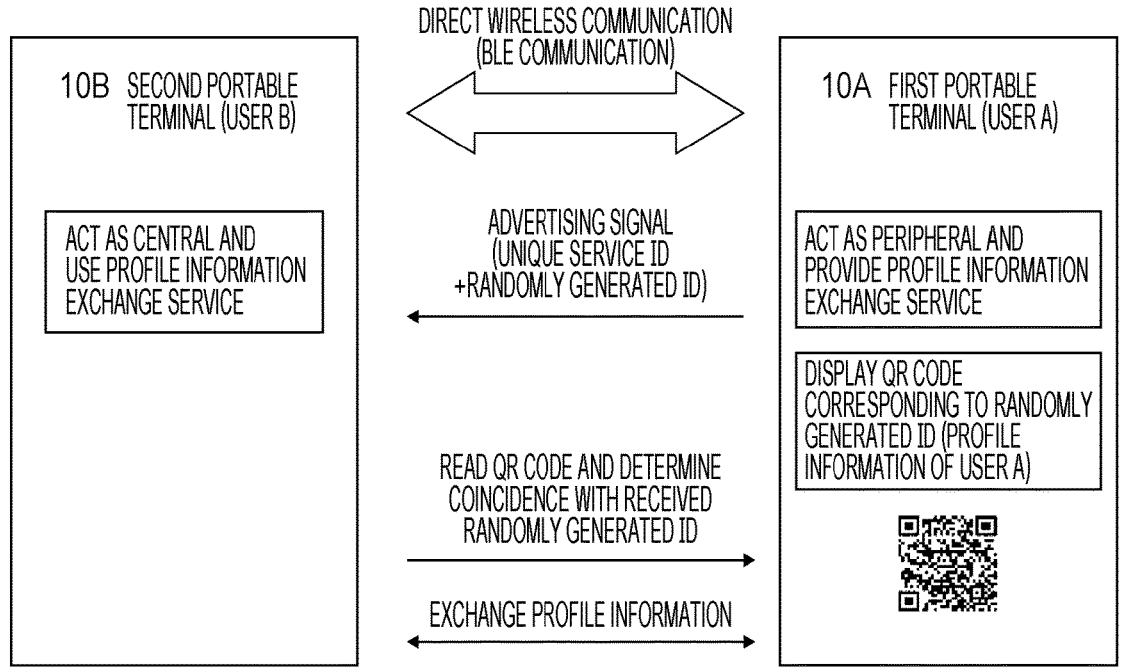
FIG. 1 is a view for illustrating a profile information exchange system according to one embodiment.

Hereinafter, it is described in further detail with reference to the attached drawings. A preferred embodiment is illustrated in the drawings. However, it is possible to implement in many different modes and is not limited to the embodiment described in this specification.

[Profile Information Exchange System]

With reference to FIG. 1 illustrating a system in one embodiment, a profile information exchange system 1 is provided with a first portable terminal 10A and a second portable terminal 10B. In this profile information exchange system 1, profile information of terminal users may be exchanged by direct wireless communication between portable terminals without intervention of an external communication facility environment such as Internet connection and an intermediary server.

The direct wireless communication between the portable terminals used in the profile information exchange system 1 is short-distance wireless communication including communication conforming to Bluetooth Low Energy (BLE) which is an extended specification of Bluetooth (registered trademark) (in a case where limitation is not required, this is simply referred to as BLE communication). The BLE communication has, for example, an advantage that an application may execute required processing with low power consumption without an instruction from an operating system (OS) of the portable terminal. The Bluetooth communication before the extended specification, infrared communication, and other short-distance wireless communication such as near field communication (NFC) may also be used according to implementation conditions such as a communication data size (data amount).

The profile information of the terminal users used in the profile information exchange system 1 includes personal information such as name, company name, department, address, contact information, and birthday. The profile information may also include a face image of the terminal user. Such profile information is created in advance for business use and private use by the terminal user and registered in advance in an address book (or telephone book) of the first portable terminal 10A and the second portable terminal 10B.

In the profile information exchange system 1 using the BLE communication as the direct wireless communication, the first portable terminal 10A has a function of acting as a peripheral (peripheral device) and provides profile information exchange service to be described in detail later. In addition, the second portable terminal 10B has a function of acting as a central (central device) and uses the profile information exchange service.

Each of the first portable terminal 10A and the second portable terminal 10B is a portable terminal with a camera, and is realized by, for example, a smartphone, but may also be a notebook personal computer or a tablet type terminal.

[Portable Terminal]

Figure 2:
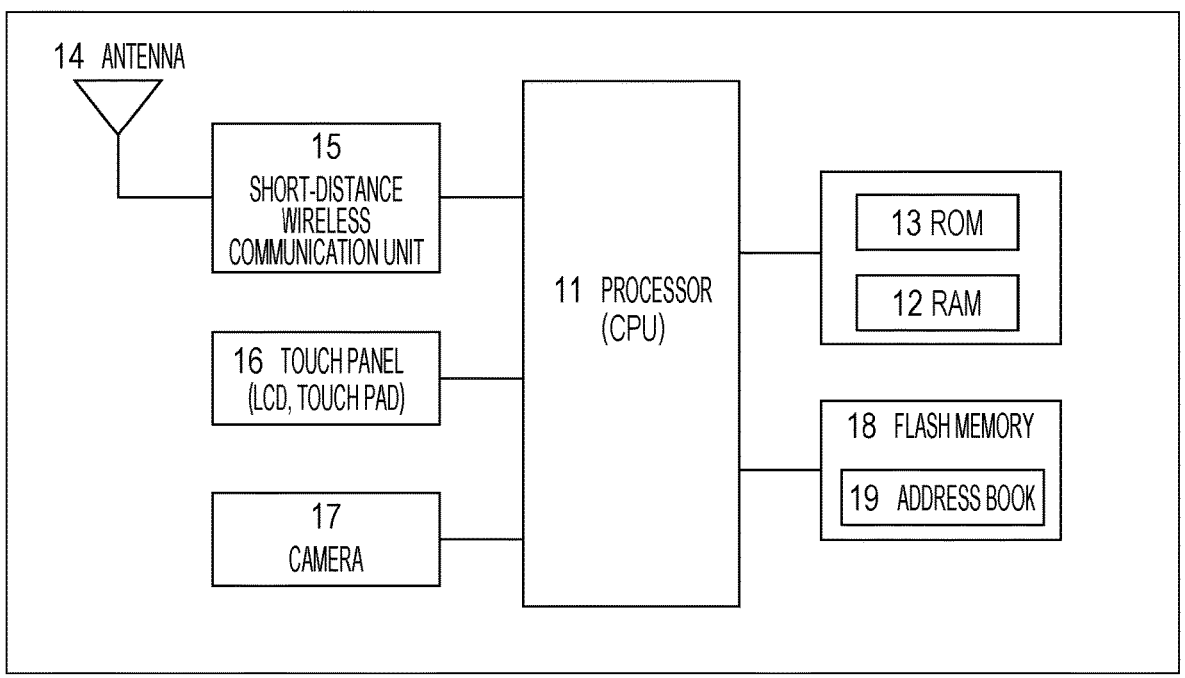
FIG. 2 is a block diagram illustrating a configuration of a portable terminal according to one embodiment.

FIG. 2 illustrates a configuration of the first portable terminal 10A and the second portable terminal 10B (in a case where limitation is not required, they are simply referred to as the portable terminals 10) in the profile information exchange system 1 illustrated in FIG. 1.

In a case where the portable terminal 10 is the smart phone, this includes the following elements as a hardware configuration in order to perform each function. That is, a control function unit is provided with a processor (central processing unit (CPU)) 11, a random access memory (RAM) 12 as a working memory, and a read only memory (ROM) 13 which stores a boot program for startup.

A communication function unit is provided with an antenna 14, a short-distance wireless communication unit 15, an audio input/output unit (not illustrated) including a microphone, a speaker, and an ear receiver, and a global positioning system (GPS) receiver (not illustrated).

An information display/input/designation function unit is provided with a touch panel (touch screen) 16 including a display (liquid crystal display (LCD)) and a touch pad. An imaging function unit includes a camera 17.

Furthermore, an information holding function unit is fixedly or removably provided with a non-volatile flash memory 18 for rewritably storing an OS, various application programs such as a profile information exchange program, and various pieces of information (including data). The flash memory 18 stores an address book (or telephone book) 19 for storing the profile information for business use and private use of the user him/herself and a communication target (exchange partner).

In order to logically realize a profile information exchange service function to be described later in detail, in the portable terminal 10, the profile information exchange program is installed as an application program in the flash memory 18 of the information holding function unit, and the processor 11 develops the profile information exchange program in the RAM 12 to execute in response to a request from the user.

The processor 11 executes the profile information exchange program to perform profile information exchange processing to be described later in cooperation with the above-described hardware components such as the control function unit, the communication function unit, the information display/input/holding function unit, the imaging function unit, and the information holding function unit.

[Profile Information Exchange Service]

Next, an operation example in the profile information exchange system 1, the first portable terminal 10A, and the second portable terminal 10B of one embodiment illustrated in FIGS. 1 and 2 is described with reference to FIGS. 3A, 3B, and 4.

In the profile information exchange system 1 of one embodiment using the BLE communication as the direct wireless communication between the portable terminals, an example of processing in which a user A of the first portable terminal 10A leads to exchange the profile information when the user A of the first portable terminal 10A and a user B of the second portable terminal 10B are intended to exchange the profile information each other is described.

In a case where the user A leads, the first portable terminal 10A acts as the peripheral to advertise an advertising signal to be described later in detail in order to notify the surroundings of its presence, and provides the profile information exchange service. In addition, the second portable terminal 10B acts as the central which scans the presence of the peripheral and detects the peripheral on the basis of the advertised advertising signal, and uses the profile information exchange service.

[Pre-processing 1] The user A of the first portable terminal 10A and the user B of the second portable terminal 10B touch (also referred to as "designate") a display menu (icon) "create profile information" on the touch panel 16, creates in advance the profile information for business use and private use which selectively includes personal information such as the face image, name, company name, department, address, contact information, and birthday, and registers the same in the address book 19 of the first portable terminal 10A and the second portable terminal 10B in advance.

[Pre-processing 2] In addition, the user A of the first portable terminal 10A designates a display menu "create service identification code" on the touch panel 16 and generates a unique service identification code (sometimes simply referred to as a unique service ID) in advance and registers the same in advance in the flash memory 18 of the first portable terminal 10A.

Note that, the user B of the second portable terminal 10B may also generate a unique service ID in advance and register the same in advance in the flash memory 18 of the second portable terminal 10B similarly. The unique service ID registered in advance in the second portable terminal 10B is used when the user B leads the exchange of the profile information, but is not used in the exchange of the profile information led by the user A.

Although the unique service IDs generated by the user A of the first portable terminal 10A and the user B of the second portable terminal 10B are different from each other, they partially include the same character determined in advance for commonly specifying the profile information exchange service. In order to generate the unique service IDs different from each other in the first portable terminal 10A and the second portable terminal 10B, a method based on time information (year/month/day and hour: minute: second) and geographical positional information (longitude and latitude) may be adopted. Either standard time or total seconds (accumulated seconds) may be applied as the time information indicating current time. The geographical positional information where the first portable terminal 10A or the second portable terminal 10B is located may be obtained by using the GPS.

[Profile Information Exchange Processing] When the user A of the first portable terminal 10A and the user B of the second portable terminal 10B designate a display menu "exchange profile information" on the touch panel 16, in the first portable terminal 10A and the second portable terminal 10B, the processor 11 develops the profile information exchange program in the RAM 12 and starts the profile information exchange processing (refer to FIGS. 3A and 3B) in response to the designation. Note that, since the following profile information exchange processing is executed by the processor 11, the description of a subject of the processing is omitted unless it becomes unclear.

[Processing A1] In the first portable terminal 10A, after the user A designates the display menu "select profile information" on the touch panel 16, the profile information for business use of the user A which is selected is obtained from the address book 19. The obtained profile information for business use of the user A is temporarily stored in the RAM 12 for use in later processing.

[Processing B1] In the second portable terminal 10B, after the user B designates the display menu "select profile information" on the touch panel 16, the profile information for business use of the user B which is selected is obtained from the address book 19. The obtained profile information for business use of the user B is temporarily stored in the RAM 12 for use in later processing.

[Processing A2] In the first portable terminal 10A, a randomly generated identification code (sometimes simply referred to as a randomly generated ID) is generated as a random number on the basis of the profile information for business use of the user A obtained in the processing A1 to be temporarily stored in the RAM 12 for use in later processing. The randomly generated identification code is generated differently each time. In addition, the randomly generated identification code herein generated as a random number corresponds to a character string of the profile information for business use of the user A. That is, even if the image data is included in the profile information for business use of the user A, this is not made a target for which the randomly generated identification code is generated, so that a communication data size (data amount) is suppressed. The character string and image data included in the profile information for business use of the user A may be discriminated by the existing technology.

[Processing A3] In the first portable terminal 10A, a QR code is generated as a two-dimensional code corresponding to the randomly generated ID generated as a random number in the processing A2 to be displayed (displayed on a screen) on the touch panel 16.

[Processing A4] The first portable terminal 10A generates the advertising signal in a packet form including a unique service ID and a randomly generated ID, and transmits the advertising signal to advertise. Herein, the unique service ID is registered in advance in the flash memory 18 by the above-described preprocessing 2, and the randomly generated ID is temporarily stored in the RAM 12 by the above-described processing A2.

[Processing B2] The second portable terminal 10B scans the unique service ID to detect the first portable terminal 10A as the peripheral.

Strictly speaking, the second portable terminal 10B receives the advertising signal transmitted from the first portable terminal 10A, and detects the character determined in advance for specifying the profile information exchange service based on the unique service ID included in the signal.

[Processing B3] The second portable terminal 10B specifies the communication target (exchange partner) by reading the QR code displayed on the touch panel 16 of the first portable terminal 10A corresponding to the character string of the randomly generated ID by an embedded camera 17.

Strictly speaking, the second portable terminal 10B determines whether the randomly generated ID included in the advertising signal received from the first portable terminal 10A is the same as the read QR code. Then, the communication target is specified as the first portable terminal 10A by determining coincidence of the contents of the randomly generated ID and the QR code.

[Processing B4] When the second portable terminal 10B specifies the communication target as the first portable terminal 10A, this establishes the direct wireless connection with the first portable terminal 10A and transmits the profile information for business use of the user B by the short-distance wireless communication unit 15. The profile information for business use of the user B herein transmitted includes the image data.

[Processing A5] When the first portable terminal 10A receives the profile information for business use of the user B, this stores the received profile information for business use of the user B in the address book 19 and displays the same on the touch panel 16 (refer to FIG. 4). The first portable terminal 10A transmits the profile information for business use of the user A to the second portable terminal 10B by the short-distance wireless communication unit 15. The profile information for business use of the user A herein transmitted includes the image data.

[Processing B5] When the second portable terminal 10B receives the profile information for business use of the user A, this stores the received profile information for business use of the user A in the address book 19 and displays the same on the touch panel 16 (refer to FIG. 4).

By the series of processes described above, the exchange of the profile information for business use between the first portable terminal 10A and the second portable terminal 10B is completed, and the profile information exchange processing is finished.

Variation of One Embodiment

Since the image data (face image data of user) is included in the profile information in the processing B4 and the processing A5 of the profile information exchange processing described above, the image data may be compressed and transmitted.

In the description of the operation of the above-described one embodiment, the first portable terminal 10A is made a provider of the profile information exchange service, and the second portable terminal 10B is made a user of the profile information exchange service; however, each of the portable terminals 10A and 10B may be implemented in a configuration having both functions.

In a case of applying the BLE communication to the direct wireless communication between the portable terminals, the unique service ID (unique service identification code) and randomly generated ID (randomly generated identification code) included in the advertising signal in a packet form may adopt a universally unique identification code (universally unique identifier (UUID)). This UUID may use 122 bits out of 128 bits (16 bytes) for unique identification information. Regarding a detailed format of the advertising signal in the packet form, the notification document of Bluetooth Special Interest Group (SIG) may be referred to.

In the profile information exchange system 1 according to one embodiment described above, the QR code which is one type of a matrix system of the two-dimensional code is used, but if information is provided in both vertical and horizontal directions and an amount of information that may be recorded is large, it is also possible to use other matrix systems such as a stacked barcode system being another two-dimensional code.

Effect of One Embodiment

The profile information exchange system 1 of one embodiment using the BLE communication as the direct wireless communication between the portable terminals is provided with the first portable terminal 10A which acts as the peripheral and provides the profile information exchange service and the second portable terminal 10B which acts as the central and uses the profile information exchange service. The first portable terminal 10A of the user A advertises the advertising signal including the unique service ID (unique service identification code) and the randomly generated ID (randomly generated identification code) and displays the QR code corresponding to the randomly generated ID based on the profile information of the user A. The second portable terminal 10B of the user B specifies the first portable terminal 10A of the communication target (exchange partner) by reading the QR code displayed on the first portable terminal 10A and determining coincidence with the received randomly generated ID and exchanges the profile information.

As a result, the profile information may be exchanged without requiring pairing setting in advance between the first portable terminal 10A and the second portable terminal 10B.

In addition, since the first portable terminal 10A from which the QR code is read and the second portable terminal 10B which reads the QR code mutually become the exchange targets, it is possible to easily and surely specify the exchange partner of the profile information when exchanging the profile information.

[Other Variations]

The processing in one embodiment described above is provided as a computer-executable program, and may be provided via a non-transitory computer-readable recording medium such as a CD-ROM or a flexible disk, and further via a communication line.

In addition, an arbitrary plurality of or all the processes of the embodiment described above can be selected and combined to be carried out.

DESCRIPTION OF THE REFERENCE NUMERALS 1 profile information exchange system
10 portable terminal
10a first portable terminal
10b second portable terminal
11 processor
15 short-distance communication unit
16 touch panel
17 camera
19 address book

The invention claimed is:

1. A profile information exchange system which enables exchange of profile information of terminal users by direct wireless communication between portable terminals without intervention of an external communication facility environment, the system comprising:

a first portable terminal that provides a profile information exchange service; and a second portable terminal that uses the profile information exchange service, wherein a processor in the first portable terminal of a first user causes a wireless communication unit to output a wireless communication signal directly to the second portable terminal including both a unique service identification code and a randomly generated identification code based on profile information of the first user and displays a two-dimensional code corresponding to the randomly generated identification code based on the profile information of the first user on a screen of the first portable terminal, and a processor in the second portable terminal of a second user receives the direct wireless communication signal and causes an optical reading unit to read the two-dimensional code displayed on the screen of the first portable terminal and determines coincidence between the read two-dimensional code and the received randomly generated identification code, thereby specifying the first portable terminal of an exchange partner, and responsive to determining the coincidence exchanges profile information of the second user with the profile information of the first user of the profile information exchange service.

2. The profile information exchange system according to claim 1,
wherein the unique service identification code partially includes predetermined characters for specifying the profile information exchange service.

3. The profile information exchange system according to claim 1,
wherein the randomly generated identification code is generated as a random number so as to correspond to only a character string of the profile information.

4. The profile information exchange system according to claim 1,
wherein the profile information of the first user and the profile information of the second user are created in advance for business use and private use and are registered in advance in an address book of the first portable terminal and an address book of the second portable terminal, respectively.

5. The profile information exchange system according to claim 1,
wherein, when image data is included in the profile information, the image data is compressed and transmitted.

6. The profile information exchange system according to claim 1,
wherein the direct wireless communication is short-distance wireless communication including BLE communication.

7. The profile information exchange system according to claim 1,
wherein, when the direct wireless communication is BLE communication,
the first portable terminal acts as a peripheral and provides the profile information exchange service,
the second portable terminal acts as a central and uses the profile information exchange service,
the signal is an advertising signal including the unique service identification code and the randomly generated identification code, and
the unique service identification code and the randomly generated identification code are universally unique identification codes.

8. A profile information exchange method comprising:
controlling a processor in a first portable terminal of a first user that provides a profile information exchange service to cause a wireless communication unit to output a wireless communication signal directly to the second portable terminal including both a unique service identification code and a randomly generated identification code based on profile information of the first user and to display a two-dimensional code corresponding to the randomly generated identification code based on the profile information of the first user on a screen of the first portable terminal in a profile information exchange system that enables exchange of profile information of terminal users by direct wireless communication between portable terminals without intervention of an external communication facility environment; and
controlling a processor in a second portable terminal of a second user that uses the profile information exchange service to receive the direct wireless communication signal and cause an optical reading unit to read the two-dimensional code displayed on the screen of the first portable terminal and determine coincidence between the read two-dimensional code and the received randomly generated identification code, thereby specifying the first portable terminal of an exchange partner, and responsive to determining the coincidence exchange profile information of the second user with the profile information of the first user in the profile information exchange system.

9. The profile information exchange method according to claim 8,
wherein the unique service identification code partially includes predetermined characters for specifying the profile information exchange service.

10. The profile information exchange method according to claim 8,
wherein the randomly generated identification code is generated as a random number so as to correspond to only a character string of the profile information.

11. The profile information exchange method according to claim 8,
wherein the profile information of the first user and the profile information of the second user are created in advance for business use and private use and are registered in advance in an address book of the first portable terminal and an address book of the second portable terminal, respectively.

12. The profile information exchange method according to claim 8,
wherein, when image data is included in the profile information, the image data is compressed and transmitted.

13. The profile information exchange method according to claim 8,
wherein the direct wireless communication is short-distance wireless communication including BLE communication.

14. The profile information exchange method according to claim 8,
wherein, when the direct wireless communication is BLE communication,
the first portable terminal acts as a peripheral and provides the profile information exchange service,
the second portable terminal acts as a central and uses the profile information exchange service,
the signal is an advertising signal including the unique service identification code and the randomly generated identification code, and
the unique service identification code and the randomly generated identification code are universally unique identification codes.

* * * * *